US007454562B2

(12) United States Patent
Jankins et al.

(10) Patent No.: US 7,454,562 B2
(45) Date of Patent: Nov. 18, 2008

(54) PERFORMANCE INFORMATION IN DIGITAL STORAGE MEMORY MODULE APPARATUS AND METHOD

(75) Inventors: Mark Jankins, Studio City, CA (US); Monte Davidoff, Cupertino, CA (US); John M. Moffat, Moorpark, CA (US)

(73) Assignee: Digi-Flicks International, Inc., Cary, IL (US)

( * ) Notice: Subject to any disclaimer, the term of this patent is extended or adjusted under 35 U.S.C. 154(b) by 423 days.

(21) Appl. No.: 11/257,384

(22) Filed: Oct. 24, 2005

(65) Prior Publication Data

US 2007/0094443 A1 Apr. 26, 2007

(51) Int. Cl.
*G06F 12/00* (2006.01)
*G06F 11/00* (2006.01)
*G11B 20/18* (2006.01)

(52) U.S. Cl. .................. 711/112; 711/162; 714/712; 714/718; 714/704

(58) Field of Classification Search .............. 711/170, 711/114, 112, 154; 361/726; 714/6, 42, 714/54, 712, 715, 718, 704, 732, 55, 699
See application file for complete search history.

(56) References Cited

U.S. PATENT DOCUMENTS

| 4,500,183 | A | | 2/1985 | Tanikawa |
| 4,806,960 | A | | 2/1989 | Momot et al. |
| 5,293,197 | A | | 3/1994 | Iwao |
| 5,394,206 | A | | 2/1995 | Cocca |
| 5,557,183 | A | | 9/1996 | Bates et al. |
| 5,572,271 | A | | 11/1996 | Pelican |
| 5,828,583 | A | * | 10/1998 | Bush et al. ............ 714/42 |
| 5,923,876 | A | * | 7/1999 | Teague ................ 714/20 |
| 6,098,146 | A | * | 8/2000 | Bouvier et al. ........ 711/100 |
| 6,157,784 | A | | 12/2000 | Pagano et al. |
| 6,205,060 | B1 | | 3/2001 | Sanda et al. |
| 6,247,857 | B1 | | 6/2001 | Wheeler et al. |
| 6,430,372 | B2 | | 8/2002 | Ishihara et al. |
| 6,466,745 | B1 | | 10/2002 | Nakazawa |
| 6,493,656 | B1 | | 12/2002 | Houston et al. |

(Continued)

OTHER PUBLICATIONS

Blachek, Michael D. and Iverson, David E.; "Predictive Failure Analysis-Advanced Condition Monitoring", IBM Corporation, Nov. 1994.*

(Continued)

*Primary Examiner*—Pierre-Michel Bataille
(74) *Attorney, Agent, or Firm*—Fitch, Even, Tabin & Flannery

(57) ABSTRACT

A digital storage memory module (200) comprises a housing (201) having a first memory (202) and a second memory (205) disposed therein. In one embodiment the first memory comprises, for example, a hot-swappable cinematic media content disk drive and the second memory comprises, for example, a flash memory. In one embodiment these two memories, though sharing a common housing, are communicatively isolated from one another. In one embodiment this digital storage memory module further comprises a first and second memory interface (203 and 209) that couple, respectively, to the first and second memory and that are accessible external to the housing such that cinematic media content can be uploaded to and downloaded from the first memory and performance information regarding the first memory can be uploaded to and downloaded from the second memory.

24 Claims, 2 Drawing Sheets

U.S. PATENT DOCUMENTS

| | | | |
|---|---|---|---|
| 6,564,290 B1 * | 5/2003 | Lechner | 711/111 |
| 6,600,614 B2 | 7/2003 | Lenny et al. | |
| 6,770,497 B2 * | 8/2004 | Ihm | 438/20 |
| 6,813,450 B2 | 11/2004 | Barrett | |
| 6,877,091 B2 | 4/2005 | Nomizo et al. | |
| 6,957,291 B2 * | 10/2005 | Moon et al. | 710/302 |
| 7,272,081 B2 * | 9/2007 | Goodman et al. | 369/30.27 |
| 7,373,559 B2 * | 5/2008 | Guha | 714/54 |
| 2006/0085595 A1 * | 4/2006 | Slater | 711/114 |

OTHER PUBLICATIONS

Colegrove, Dan; "Informational Exception Condition Reporting" ATA-3 Proposal (X3T10/95-111r1), IBM Corporation, Mar. 1995.*

Patterson et al., "A Case for Redundant Arrays of Inexpensive Disks (RAID)," ACM Computing, 1998.*

Stratus Technologies, HP-UX Operating System: Fault Tolerant System Administration, © 2003 Stratus Technologies Bermuda, Ltd., Part No. R1004H; Revision No. 07; Operating System: HP-UX version 11.00.03; Publication Date: May 2003, 175 pages.

* cited by examiner

PERFORMANCE INFORMATION IN DIGITAL STORAGE MEMORY MODULE APPARATUS AND METHOD

TECHNICAL FIELD

This invention relates generally to the storage (and corresponding conveyance) of digital content and more particularly cinematic media content.

BACKGROUND

Digital storage memory platforms of various kinds are well known in the art. Such platforms span a wide range of storage persistence, capacity, form factor, and enabling technology characteristics. Some such memory platforms comprise so-called hot swappable platforms in that they can be brought on-line in a given application without requiring that the interfacing platform itself be restarted, initialized, or the like. Memory platforms of this kind are sometimes used to store cinematic media content.

Cinematic media content is well known in the art and typically comprises both visual imagery and synchronized audio material that is intended for public presentation and display in a theater setting before a potentially large audience. Though film has traditionally served as the storage and carrier vehicle for cinematic media content, in more recent times digital storage has been increasingly used for this purpose. For example, a digital version of a movie to be displayed at a theater can be downloaded to a digital storage memory. That memory is then transported to the theater where the cinematic media content is extracted and then projected on a movie theater screen.

Such digital storage memories tend to have a relatively high capacity in order to accommodate the relatively large sizes that characterize cinematic media content. Such a requirement, in addition to other characteristic design elements, tends to render such digital storage memories relatively costly. As a result, industry participants are motivated to reuse such digital storage memories rather than to discard or otherwise re-purpose them. Reuse, of course, requires that the digital storage memory be re-transported back to a distribution center so that the existing cinematic media content can be removed (or overwritten) and new cinematic media content downloaded thereto.

Such a cycle can repeat many times. Such usage exposes the digital storage memory to a variety of potential and actual stresses that can, over time, lead to the gradual or catastrophic failure of the digital storage memory. Given the intended application setting of such digital storage memories, platform failure comprises a serious consequence that poses considerable problems with respect to lost income, potential liability, and customer satisfaction, to name but a few.

At present, industry participants face a conundrum; they tend to either retire a given digital storage memory well prior to when a disruption in service event can likely occur or accept the risk and bear the consequences when and as such incidents occur. Both of these approaches pose problems relating to cost, convenience, and reputation. As another option the digital storage memories can undergo regular scheduled preventive maintenance. While potentially effective, however, this too represents considerable additional cost and removes the memories from service from time to time to facilitate such an approach.

BRIEF DESCRIPTION OF THE DRAWINGS

The above needs are at least partially met through provision of the digital storage memory module apparatus and method described in the following detailed description, particularly when studied in conjunction with the drawings, wherein.

Figure 1:
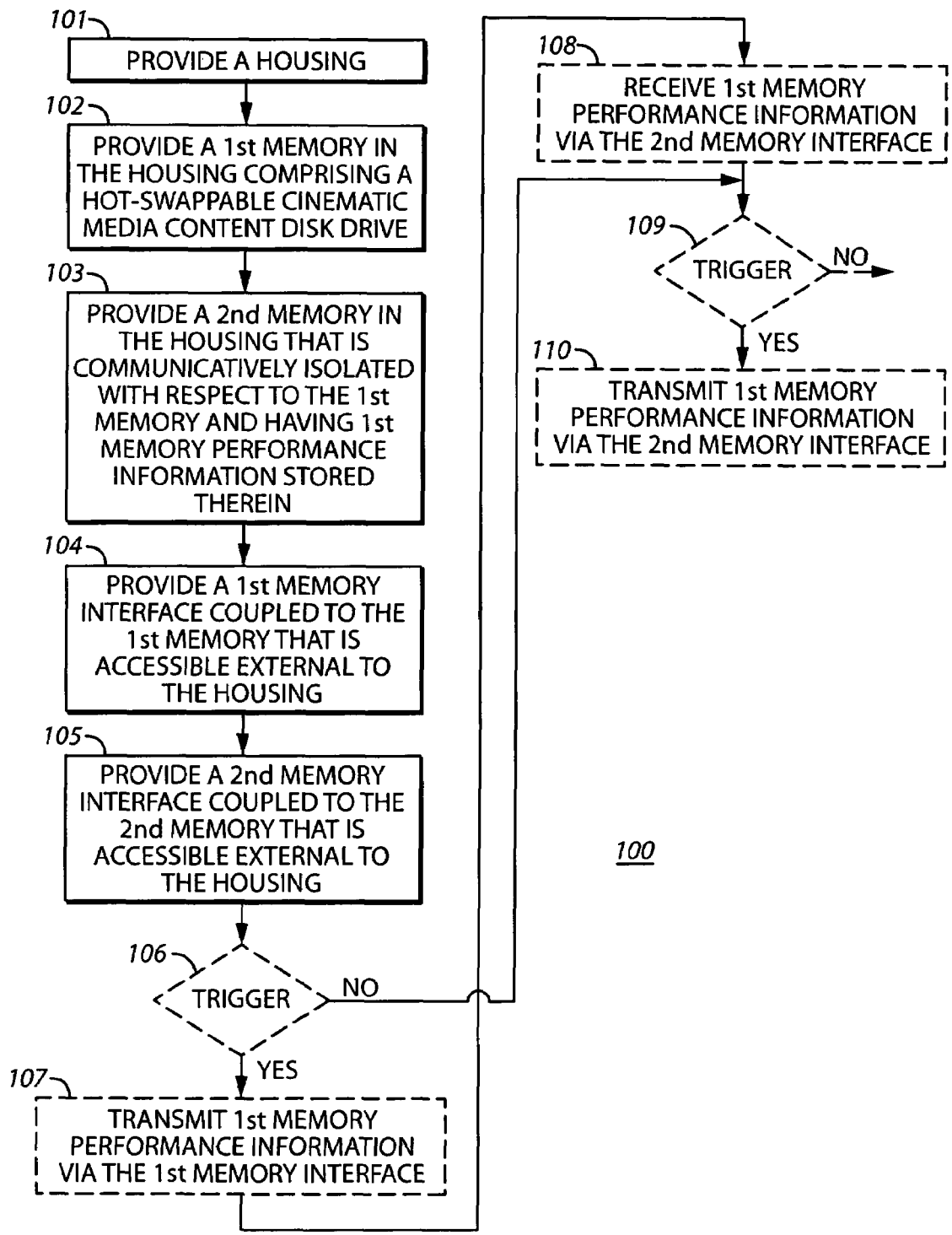
FIG. 1 comprises a flow diagram as configured in accordance with various embodiments of the invention.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required. It will also be understood that the terms and expressions used herein have the ordinary meaning as is accorded to such terms and expressions with respect to their corresponding respective areas of inquiry and study except where specific meanings have otherwise been set forth herein.

DETAILED DESCRIPTION

Generally speaking, pursuant to these various embodiments, a digital storage memory module comprises a housing having a first memory and a second memory disposed therein. In one embodiment the first memory comprises, for example, a hot-swappable cinematic media content disk drive and the second memory comprises, for example, a flash memory. In one embodiment these two memories, though sharing a common housing, are communicatively isolated from one another. In one embodiment this digital storage memory module further comprises a first and second memory interface that couple, respectively, to the first and second memory and that are accessible external to the housing such that cinematic media content can be uploaded to and downloaded from the first memory and performance information regarding the first memory can be uploaded to and downloaded from the second memory.

So configured, performance information regarding the first memory can be externally collected from the first memory via the first memory interface and then uploaded to the second memory via the second memory interface. Such events can occur, for example, upon introducing and/or extracting a given digital storage memory module to/from a cinematic media content downloader at, for example, a theater venue. By one approach such events can occur in an automatic fashion and substantially transparently with respect to an external observer.

So configured, upon returning the digital storage memory module to, for example, a cinematic media content uploader, the captured performance information can be automatically or non-automatically recovered from the second memory. This performance information can then serve to facilitate a diagnostic study of the first memory. Such a study can be conducted by a trained individual or can comprise an automated study where, for example, various performance criteria are compared against corresponding thresholds that represent, for example, points or levels of concern.

This, in turn, permits a relatively rapid check regarding the relative health of the first memory to occur at relatively low cost. Maintenance can now be scheduled when it appears more likely that maintenance is actually required rather than as per a schedule that ignores any indication of actual need. This approach also permits a given digital storage memory module to be used and re-used with relative confidence that the platform will not fail during a next round or cycle of transportation and usage.

These and other benefits may become clearer upon making a thorough review and study of the following detailed description. Referring now to the drawings, and in particular to FIG. 1, a process 100 that accords with these teachings provides 101 a housing. This housing can, of course, assume any of a wide variety of form factors and shapes and can be comprised of any of a wide variety of materials. By one embodiment the housing can have a trapezoidal-shaped cross section as is described in an earlier filed patent application entitled CINEMATIC MEDIA CONTENT STORAGE SYSTEM INCLUDING A DIGITAL STORAGE MEMORY MODULE as was filed on Jun. 24, 2005 and having application Ser. No. 11/166,796 (the contents of which are incorporated herein by this reference).

This process 100 also provides for provision 102 of a first memory that is disposed within the housing. By one embodiment this first memory comprises a hot-swappable cinematic media content disk drive and more particularly a hot-swappable Serial Advanced Technology Attachment (SATA) disk drive as is known in the art. This first memory serves, for example, to contain cinematic media content such as a digitized version of the video and audio portions of a movie or the like.

In a preferred approach, this process 100 also provides for provision 103 of a second memory that is also disposed within the housing but which is communicatively isolated with respect to the first memory. That is, the first and second memory, though likely physically proximal to one another within the housing, are nevertheless isolated from one another in that they cannot directly or indirectly exchange data with one another within the confines of the housing.

This second memory, notwithstanding the above-described isolation from the first memory, serves to store performance information regarding the first memory therein. This performance information will typically comprise information regarding the successful or unsuccessful operations of the first drive. A non-exhaustive listing of exemplary information of this kind might comprise, though not be limited to:
- a read error rate;
- spin-up time;
- a start/stop count;
- a reallocated sector count;
- a seek error rate;
- accumulated power-on hours;
- a spin retry count;
- a calibration retry count;
- a power cycle count;
- a read soft error rate;
- a present temperature;
- information regarding recovered hardware-based error correction codes;
- a reallocated event count;
- information regarding current/pending sectors;
- information regarding uncorrectable off-line events;
- information regarding an Ultra Direct Memory Access (UDMA) Cyclic Redundancy Check (CRC) error count.

Such information can serve, as noted below, to aid in determining a present state of operability of the first memory while also aiding in facilitating an analysis of historical operational trends that can also serve to suggest or predict likely future performance of the first memory.

This process 100 also provides 104 a first memory interface that operably couples to the first memory and that is accessible external to the housing such that the cinematic media content can be uploaded to the first memory and downloaded from the first memory via that first memory interface. Various interfaces can be employed in this service with specific acceptable examples being noted in the aforementioned CINEMATIC MEDIA CONTENT STORAGE SYSTEM INCLUDING A DIGITAL STORAGE MEMORY MODULE reference. This process 100 then also provides 105 a second memory interface that operably couples to the second memory and that is also accessible external to the housing. So configured, the aforementioned performance information regarding the first memory can be uploaded to the second memory and/or downloaded therefrom via this second memory interface.

As noted, the first and second memories have no communicative inter-connection that is native to the digital storage memory module itself. Instead, as per these teachings, performance information is gathered from the first memory and transferred via an external loop and process to the second memory. In turn, the performance information so stored in the second memory can be later extracted and used by another external process as desired. By one embodiment, one or more of these actions can be effected responsive to one or more trigger events of choice.

For example, by one optional approach, upon detecting 106 a first predetermined trigger this process 100 can provide for transmission 107 of performance information regarding the first memory via the first memory interface. There are many ways by which such transmission can be realized. By one approach, for example, the first memory can be S.M.A.R.T enabled (where this acronym refers to Self-Monitoring Analysis and Reporting Technology as has been developed to facilitate the identification and recall of performance related information from disk drives as will be well understood by those skilled in the art) and corresponding S.M.A.R.T. protocols and techniques employed to obtain such performance information from the first memory.

This same response to a detected trigger can also provide for reception 108 of the above-noted first memory performance information at the second memory via the second memory interface. For example, a same platform as receives the performance information from the first memory can then provision the second memory with this performance information. If desired, in addition to the kinds of performance-related information as has been described above, this performance information can further comprise, for example:
- a time stamp as corresponds to at least one other performance data entry (which time stamp may correlate to when the information was internally initially cataloged by the first memory, when the information was transmitted by the first memory as described above, when the information was provisioned to the second memory as described above, or such other time as may be useful in a given application setting);
- metadata as corresponds to the first memory (such as, but not limited to, an identifier (such as a serial number) as corresponds to the first memory, information regarding storage capacity of the first memory (such as total theoretical capacity, total available capacity, aggregate impaired capacity, and so forth), information regarding a manufacturer of the first memory, or a date of manufacture as corresponds to the first memory and/or the digital storage memory; and/or user-supplied data of choice;

to note but a few.

Any number of different trigger events may serve to initiate or enable such steps. By one approach, the housing and a corresponding housing reception platform can be provided with a lock and unlock mechanism. So configured, initiating or completing the locking action can comprise the aforementioned trigger event. This, in turn, would cause the performance information for the first memory to be captured whenever the housing is inserted into and locked into a corresponding reception platform such as a cinematic media content downloader as may be found at a theater venue. In a similar manner, it would also be possible and likely desired to also employ an unlocking event as another trigger to cause a similar obtainment of performance information from the first memory and storage of that performance information in the second memory.

As another example, in response to a trigger 109 of choice this process 100 can optionally provide for transmission 110 of the first memory performance information from the second memory via the second memory interface. One potentially useful trigger in this context would comprise engaging the housing with a cinematic media content downloader as might be found at a distribution center for cinematic media content. So configured, upon coupling a given digital storage memory module to a corresponding cinematic media content downloader to erase the contents of the first memory and/or to upload new cinematic media content thereto the cinematic media content downloader can automatically receive the stored first memory performance information. This provisioning of the cinematic media content downloader with first memory performance information, in turn, can support a diagnosis process of choice whereby the cinematic media content downloader can determine whether the digital storage memory module can in fact be trusted to likely continue successful operations.

Figure 2:
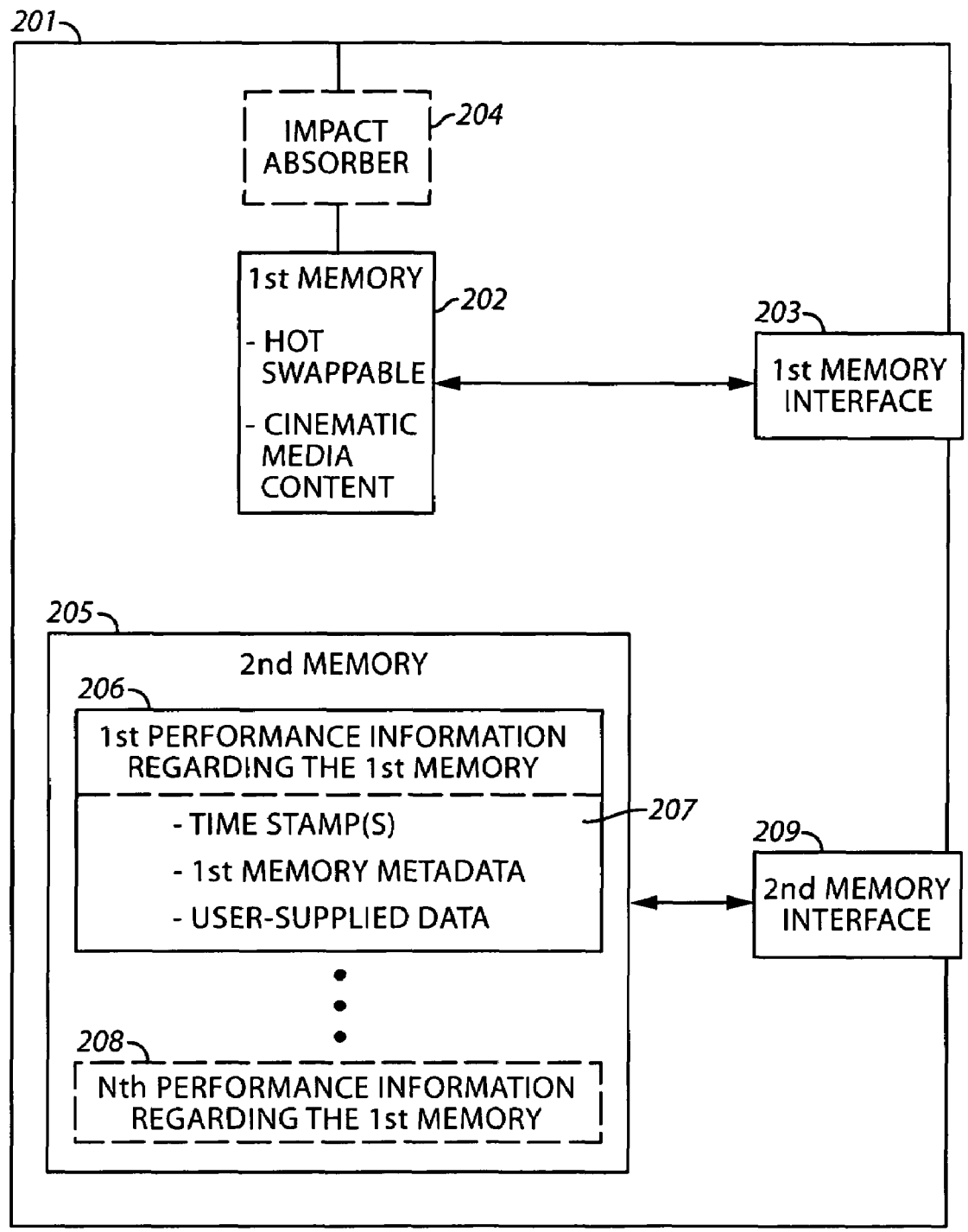
FIG. 2 comprises a block diagram as configured in accordance with various embodiments of the invention.

Those skilled in the art will appreciate that the above-described processes are readily enabled using any of a wide variety of available and/or readily configured platforms, including partially or wholly programmable platforms as are known in the art or dedicated purpose platforms as may be desired for some applications. Referring now to FIG. 2, an illustrative approach to such a platform will now be provided.

This illustrative embodiment of a digital storage memory module 200 comprises a housing 201 as described above. This housing 201 has a first memory 202 disposed and mounted therein. This first memory 202 can comprise, for example, a hot-swappable cinematic media content disk drive such as a hot-swappable Serial Advanced Technology Attachment disk drive. This first memory 202 serves, at least in part, to store cinematic media content such as, but not limited to, Digital Cinema Package material (as is well understood in the art), advertisements, movie trailers, and so forth. This first memory 202 operably couples to a first memory interface 203 that is externally accessible to the housing 201 to thereby permit cinematic media content to be uploaded to and/or downloaded from the first memory 202. In one embodiment, one or more impact absorbers 204 of choice may be disposed between the first memory 202 and the housing 201 to provide a measure of protection against damage due to physical shocks as may be imparted to the housing 201 during, for example, transport between and/or to or from theaters.

This illustrative embodiment further comprises a second memory 205 (such as a flash memory) that serves, at least in part, to contain performance information 206 regarding the first memory (which performance information 206 can be uploaded to the second memory 205, for example, via a corresponding second memory interface 209 that is also externally accessible with respect to the housing 201 (in one embodiment this second memory interface 209 can comprise, for example, a Universal Serial Bus interface as is well known in the art). As noted above, this performance information 206 can comprise additional information 207 such as, but not limited to, one or more time stamps, metadata as corresponds to the first memory, and/or user-supplied data of choice.

It is anticipated that the second memory 205 may comprise a plurality of separate performance information entries (exemplified here by an Nth such entry denoted by reference numeral 208). Such separate entries may correspond, for example, to various uploads as occurred in conjunction with various locking and unlocking events as described above as the digital storage memory module 200 moves from theater to theater during the distribution and showing of a given cinematic work.

Although the first memory 202 and the second memory 205 share the same housing 201, as noted above these two memories 202 and 205 are communicatively isolated from one another. For example, the performance information gleaned as described from the first memory 202 only makes its way to the second memory 205 via the first and second memory interfaces 203 and 209 and a corresponding platform (not shown) that effects such data movement.

So configured, such a digital storage memory module can readily serve its usual and customary role while also recording on a triggered basis various indicia regarding the operation of the first memory 202. By retaining this performance information in the second memory 205 the entire capacity of the first memory 202 remains available to store cinematic media content. Furthermore, this information remains relatively protected from operational problems that may otherwise be afflicting the first memory 202. These teachings are implementable at reasonable cost and do much to aid in ensuring and reassuring industry participants that the disk drives being used to convey cinematic content are likely to remain viable during a given cycle of usage.

Those skilled in the art will recognize that a wide variety of modifications, alterations, and combinations can be made with respect to the above described embodiments without departing from the spirit and scope of the invention, and that such modifications, alterations, and combinations are to be viewed as being within the ambit of the inventive concept. For example, if desired, the second memory could comprise a plurality of physically discrete memories that operate together as described to provide, in the aggregate, adequate storage capacity for the anticipated performance information to be stored.

We claim:

1. A digital storage memory module comprising:

a housing;

a first memory disposed within the housing, wherein the memory comprises a hot-swappable cinematic media content disk drive;

a second memory disposed within the housing that is communicatively isolated with respect to the first memory and having performance information regarding the first memory stored therein, wherein the performance information comprises, at least in part, information regarding at least one of:

a read error rate;

spin-up time;
a start/stop count;
a reallocated sector count;
a seek error rate;
accumulated power-on hours;
a spin retry count;
a calibration retry count;
a power cycle count;
a read soft error rate;
a present temperature;
information regarding recovered hardware-based error correction codes;
a reallocated event count;
information regarding current/pending sectors;
information regarding uncorrectable off-line events;
information regarding an Ultra Direct Memory Access (UDMA) Cyclic Redundancy Check (CRC) error count;
a first memory interface operably coupled to the first memory and being accessible external to the housing such that cinematic media content can be uploaded to and downloaded from the first memory;
a second memory interface operably coupled to the second memory and being accessible external to the housing such that performance information regarding the first memory can be uploaded to and downloaded from the second memory.

2. The digital storage memory module of claim 1 wherein the second memory comprises a flash memory.

3. The digital storage memory module of claim 2 wherein the first memory comprises a hot-swappable Serial Advanced Technology Attachment (SATA) disk drive.

4. The digital storage memory module of claim 1 wherein the second memory interface comprises a Universal Serial Bus interface.

5. The digital storage memory module of claim 1 wherein the performance information comprises, at least in part, a time stamp as corresponds to at least one performance data entry.

6. The digital storage memory module of claim 1 wherein the second memory further has metadata regarding the first memory stored therein.

7. The digital storage memory module of claim 6 wherein the metadata comprises at least one of:
an identifier as corresponds to the first memory;
information regarding storage capacity of the first memory;
information regarding a manufacturer of the first memory;
a date of manufacture as corresponds to the first memory.

8. The digital storage memory module of claim 1 wherein the second memory further has user-supplied data stored therein.

9. The digital storage memory module of claim 1 further comprising:
at least one impact absorber disposed between the first memory and the housing.

10. A method comprising:
providing a digital storage memory module comprising:
a housing;
a first memory disposed within the housing, wherein the memory comprises a hot-swappable cinematic media content disk drive;
a second memory disposed within the housing that is communicatively isolated with respect to the first memory and having performance information regarding the first memory stored therein, wherein the performance information comprises, at least in part, information regarding at least one of:
a read error rate;
spin-up time;
a start/stop count;
a reallocated sector count;
a seek error rate;
accumulated power-on hours;
a spin retry count;
a calibration retry count;
a power cycle count;
a read soft error rate;
a present temperature;
information regarding recovered hardware-based error correction codes;
a reallocated event count;
information regarding current/pending sectors;
information regarding uncorrectable off-line events;
information regarding an Ultra Direct Memory Access (UDMA) Cyclic Redundancy Check (CRC) error count;
a first memory interface operably coupled to the first memory and being accessible external to the housing such that cinematic media content can be uploaded to and downloaded from the first memory;
a second memory interface operably coupled to the second memory and being accessible external to the housing such that performance information regarding the first memory can be uploaded to and downloaded from the second memory;
providing a memory module interface comprising:
a first memory module interface that is arranged and configured to compatibly mechanically and electrically couple with the first memory interface of the digital storage memory module;
a second memory module interface that is arranged and configured to compatibly mechanically and electrically couple with the second memory interface of the digital storage memory module;
providing performance information regarding the first memory from the digital storage memory module via the first memory module interface;
receiving the performance information regarding the first memory at the digital storage memory module via the second memory module interface.

11. The method of claim 10 wherein the second memory interface comprises a Universal Serial Bus interface.

12. The digital storage memory module of claim 11 wherein the first memory comprises a hot-swappable Serial Advanced Technology Attachment (SATA) disk drive.

13. The method of claim 10 wherein providing performance information regarding the first memory from the digital storage memory module via the first memory module interface further comprises providing the performance information in response to locking the digital storage memory module in the memory module interface.

14. The method of claim 10 wherein providing performance information regarding the first memory from the digital storage memory module via the first memory module interface further comprises providing the performance information in response to unlocking the digital storage memory module in the memory module interface.

15. The method of claim 10 wherein receiving the performance information regarding the first memory at the digital storage memory module via the second memory module interface further comprises receiving the performance information in response to locking the digital storage memory module in the memory module interface.

16. The method of claim 10 wherein receiving the performance information regarding the first memory at the digital storage memory module via the second memory module interface further comprises receiving the performance information in response to unlocking the digital storage memory module in the memory module interface.

17. The method of claim 10 wherein the memory module interface comprises a cinematic media content downloader.

18. The method of claim 10 wherein the memory module interface comprises a cinematic media content uploader.

19. The method of claim 10 further comprising receiving the performance information regarding the first memory from the digital storage memory module via the second memory module interface.

20. The method of claim 10 wherein receiving the performance information regarding the first memory at the digital storage memory module via the second memory module interface further comprises receiving timestamp information as corresponds to the performance information via the second memory module interface.

21. A method comprising:
  providing a housing;
  providing in the housing a first memory, wherein the memory comprises a hot-swappable cinematic media content disk drive;
  providing in the housing a second memory that is communicatively isolated with respect to the first memory and that has performance information regarding the first memory stored therein, wherein the performance information comprises, at least in part, information regarding at least one of:
    a read error rate;
    spin-up time;
    a start/stop count;
    a reallocated sector count;
    a seek error rate;
    accumulated power-on hours;
    a spin retry count;
    a calibration retry count;
    a power cycle count;
    a read soft error rate;
    a present temperature;
    information regarding recovered hardware-based error correction codes;
    a reallocated event count;
    information regarding current/pending sectors;
    information regarding uncorrectable off-line events;
    information regarding an Ultra Direct Memory Access (UDMA) Cyclic Redundancy Check (CRC) error count;
  providing a first memory interface operably coupled to the first memory that is accessible external to the housing such that cinematic media content can be uploaded to and downloaded from the first memory;
  providing a second memory interface operably coupled to the second memory that is accessible external to the housing such that performance information regarding the first memory can be uploaded to and downloaded from the second memory.

22. The method of claim 21 further comprising:
  transmitting performance information regarding the first memory via the second memory module interface.

23. The method of claim 21 further comprising:
  receiving the performance information regarding the first memory via the second memory module interface.

24. The method of claim 21 further comprising:
  transmitting performance information regarding the first memory via the first memory module interface.

* * * * *